(12) United States Patent
Salter et al.

(10) Patent No.: US 9,963,066 B1
(45) Date of Patent: May 8, 2018

(54) VEHICLE RUNNING BOARD THAT PROVIDES LIGHT EXCITATION

(71) Applicant: Ford Global Technologies, LLC, Dearborn, MI (US)

(72) Inventors: Stuart C. Salter, White Lake, MI (US); Paul Kenneth Dellock, Northville, MI (US); Pietro Buttolo, Dearborn Heights, MI (US); Annette Lynn Huebner, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/595,064

(22) Filed: May 15, 2017

(51) Int. Cl.
| B60Q 1/24 | (2006.01) |
| B60Q 1/32 | (2006.01) |
| H05B 37/02 | (2006.01) |
| B60Q 1/26 | (2006.01) |
| B60R 3/00 | (2006.01) |

(52) U.S. Cl.
CPC ........... *B60Q 1/323* (2013.01); *B60Q 1/2615* (2013.01); *B60R 3/002* (2013.01); *H05B 37/0227* (2013.01)

(58) Field of Classification Search
CPC ............ B60Q 1/26; B60Q 1/323; B60R 3/002
USPC ....................................................... 362/495
See application file for complete search history.

(56) References Cited

U.S. PATENT DOCUMENTS

| 2,486,859 A | 11/1949 | Meijer et al. |
| 5,053,930 A | 10/1991 | Benavides |
| 5,709,453 A | 1/1998 | Krent et al. |
| 5,839,718 A | 11/1998 | Hase et al. |
| 5,915,830 A | 6/1999 | Dickson et al. |
| 6,031,511 A | 2/2000 | DeLuca et al. |
| 6,117,362 A | 9/2000 | Yen et al. |
| 6,179,454 B1 | 1/2001 | Hoines |
| 6,250,785 B1 * | 6/2001 | Mallia ..................... B60Q 1/323 |
| | | 362/495 |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |

(Continued)

FOREIGN PATENT DOCUMENTS

| CN | 101337492 A | 1/2009 |
| CN | 201169230 Y | 2/2009 |

(Continued)

*Primary Examiner* — Seung Lee
(74) *Attorney, Agent, or Firm* — Jason Rogers; Price Heneveld LLP (57) ABSTRACT

A lighting system of a vehicle is provided herein. The lighting system includes a photoluminescent structure coupled to an exterior of the vehicle. A running board is coupled to the vehicle and includes a housing having opposing first and second edges. A light source is located inside the housing and is disposed in greater proximity to the second edge than the first edge. A light guide is configured to direct light from the light source toward the first edge. A first optic is adjacent the first edge and is configured to direct light toward the photoluminescent structure. A second optic is adjacent the first edge and is configured to direct light toward a ground surface.

20 Claims, 5 Drawing Sheets

(56) References Cited

U.S. PATENT DOCUMENTS

| | | | |
|---|---|---|---|
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,588,357 B2 | 9/2009 | Onopa et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 9,586,527 B1 * | 3/2017 | Salter ................... B60R 3/02 |
| 9,598,004 B2 * | 3/2017 | Yang ................... B60Q 1/323 |
| 9,718,396 B2 * | 8/2017 | Wang ................. G02B 6/0021 |
| 2002/0159741 A1 | 10/2002 | Graves et al. |
| 2002/0163792 A1 | 11/2002 | Formoso |
| 2002/0172054 A1 * | 11/2002 | Teng ..................... B60Q 1/323 |
| | | 362/495 |
| 2003/0167668 A1 | 9/2003 | Kuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0009220 A1 | 1/2016 | Salter et al. |
| 2016/0016506 A1 | 1/2016 | Collins et al. |
| 2016/0102819 A1 | 4/2016 | Misawa et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 102015114910 A1 | 3/2016 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

VEHICLE RUNNING BOARD THAT PROVIDES LIGHT EXCITATION

FIELD OF THE INVENTION

The present invention generally relates to a lighting system of a vehicle, and more particularly, to a lighting system in which a running board provides light excitation to a photoluminescent structure.

BACKGROUND OF THE INVENTION

Photoluminescent structures luminesce when exposed to light excitation. Unfortunately, few options exist for actively supplying light excitation to a photoluminescent structure applied to a vehicle exterior. The present disclosure is intended to satisfy this need.

SUMMARY OF THE INVENTION

According to one aspect of the present invention, a lighting system of a vehicle is provided. The lighting system includes a photoluminescent structure coupled to an exterior of the vehicle. A running board is coupled to the vehicle and includes a housing having opposing first and second edges. A light source is located inside the housing and is disposed in greater proximity to the second edge than the first edge. A light guide is configured to direct light from the light source toward the first edge. A first optic is adjacent the first edge and is configured to direct light toward the photoluminescent structure. A second optic is adjacent the first edge and is configured to direct light toward a ground surface.

Embodiments of the lighting system may include any one or a combination of the following features:
- the first and second edges extend longitudinally along the housing;
- the first optic at least partially defines a top portion of the housing, and the second optic at least partially defines a bottom portion of the housing;
- the first optic is coupled to an upwardly extending portion of the light guide and the second optic is coupled to a downwardly extending portion of the light guide;
- the first and second optics are arranged as strips extending longitudinally along the running board;
- the light source is configured to selectively emit light of a first wavelength and a second wavelength that is different than the first wavelength;
- the photoluminescent structure is configured to luminesce in response to excitation by light of the first wavelength, and wherein the second optic is configured to convert light of the second wavelength into light of a different wavelength and direct converted light toward the ground surface;
- the running board is deployable to a first position to facilitate ingress and egress from the vehicle and a second position to facilitate delivery of light toward the vehicle to excite the photoluminescent structure, the running board extending further outward from the vehicle in the second position than in the first position;
- the first edge is configured to conceal the first optic from vehicle onlookers; and
- the light source is configured to emit at least one of a blue light and an ultraviolet light.

According to another aspect of the present invention, a running board of a vehicle is provided. The running board includes opposing first and second edges. A light source is disposed proximate the second edge. A light guide is configured to direct light from the light source toward the first edge. A first optic is disposed adjacent the first edge and is configured to direct light in an upward direction toward the vehicle. A second optic is coupled to the light guide and is configured to direct light toward a ground surface.

Embodiments of the running board may include any one or a combination of the following features:
- the first and second edges extend longitudinally along the running board, and wherein the first and second optics are arranged as strips extending longitudinally along the running board;
- the first optic at least partially defines a top portion of the running board, and the second optic at least partially defines a bottom portion of the running board, and wherein the first optic is coupled to an upwardly extending portion of the light guide and the second optic is coupled to a downwardly extending portion of the light guide;
- the light source is configured to selectively emit light of a first wavelength and a second wavelength that is different than the first wavelength;
- the first optic is configured to direct light of the first wavelength toward the vehicle to excite a photoluminescent structure that luminesces in response thereto, and wherein the second optic is configured to convert light of the second wavelength into light of a different wavelength and output converted light toward the ground surface; and
- the running board is deployable to a first position to facilitate ingress and egress from the vehicle and a second position to facilitate delivery of light toward the vehicle, the running board extending further outward from the vehicle in the second position than in the first position.

According to yet another aspect of the present invention, a running board of a vehicle is provided. The running board includes opposing first and second edges. A light source is disposed proximate the second edge. A light guide is configured to direct light from the light source toward the first edge. A first optic is coupled to the light guide and is configured to direct light toward a photoluminescent structure located external to the running board. A second optic is coupled to the light guide and is configured to direct light toward a ground surface.

Embodiments of the running board may include any one or a combination of the following features:
- the first and second edges extend longitudinally along the running board, and wherein the first and second optics are arranged as strips extending longitudinally along the running board;
- the first optic at least partially defines a top portion of the running board, and the second optic at least partially defines a bottom portion of the running board, and wherein the first optic is coupled to an upwardly extending portion of the light guide and the second optic is coupled to a downwardly extending portion of the light guide;
- the light source is configured to selectively emit light of a first wavelength and a second wavelength that is different than the first wavelength;
- the photoluminescent structure is configured to luminesce in response to excitation by light of the first wavelength, and wherein the second optic is configured to convert light of the second wavelength into light of a different wavelength and direct converted light toward the ground surface;

the running board is deployable to a first position to facilitate ingress and egress from the vehicle and a second position to facilitate delivery of light toward the vehicle to excite the photoluminescent structure, the running board extending further outward from the vehicle in the second position than in the first position; and the first edge is configured to conceal the first optic from vehicle onlookers.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
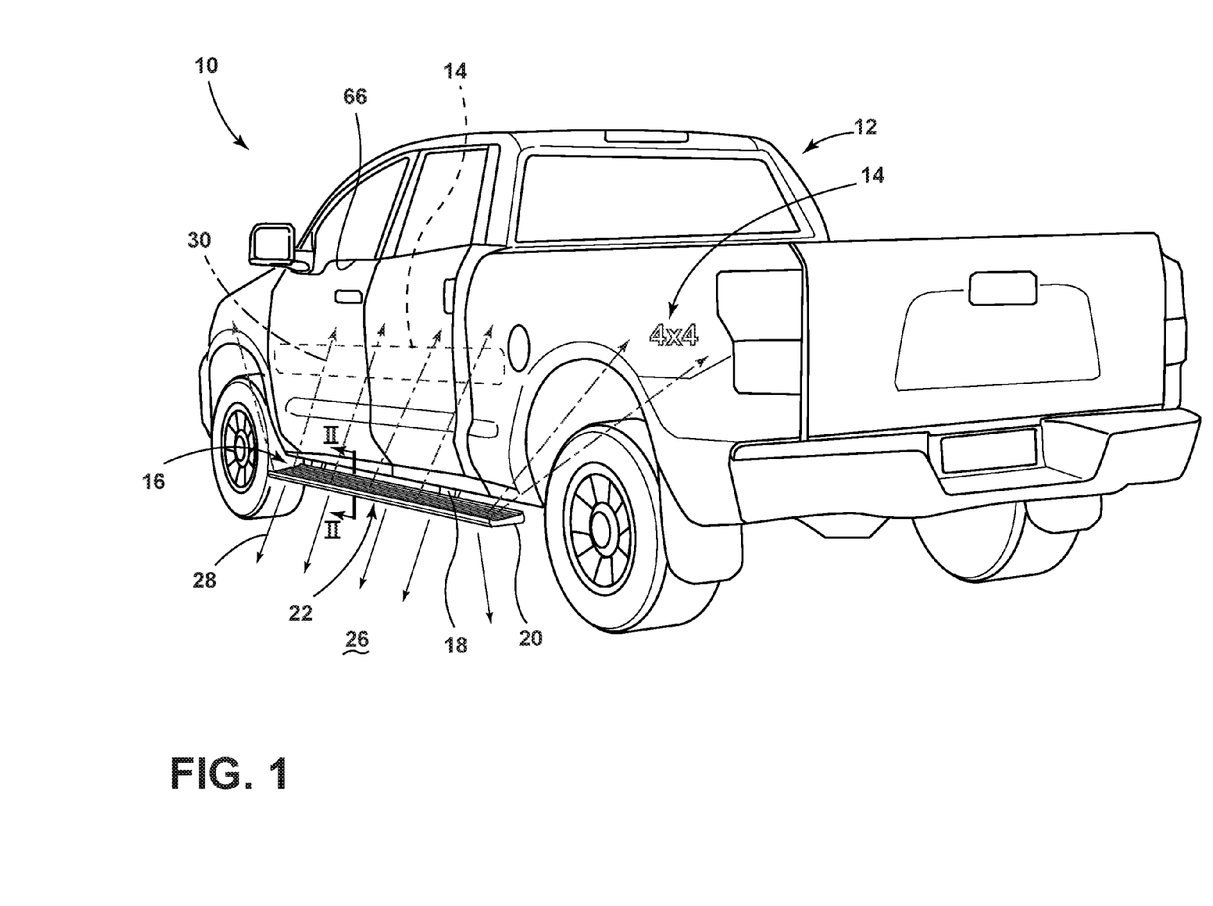
FIG. 1 is a side perspective view of a vehicle equipped with a lighting system in which a running board supplies light excitation to a photoluminescent structure.

Referring to FIG. 1, a lighting system 10 of a vehicle 12 is shown. The lighting system 10 includes a photoluminescent structure 14 and a running board 16, each of which is coupled to the vehicle 12. For exemplary purposes, the vehicle 12 is embodied as a pickup truck and the photoluminescent structure 14 is embodied as a decorative strip and icon located on the side of the vehicle 12. The photoluminescent structure 14 may be configured as a luminescent paint, a luminescent decal, or any other structure capable of luminescing in response to light excitation. It is contemplated that the photoluminescent structure 14 may include fluorescent and/or phosphorescent materials and may be arranged on or integrated with the exterior of the vehicle 12 in various sizes, shapes, and/or patterns.

In the depicted embodiment, the running board 16 is shown in a deployed position to assist with vehicle ingress and egress and is coupled to the vehicle 12 via a motor linkage 18. The motor linkage 18 is configured to move the running board 16 between the deployed position shown in FIG. 1 and a retracted or stowed position (not shown). The running board 16 includes a housing 20 having a light-transmitting portion 22 and a light source 24 (FIG. 2) inside the housing 20. Light from the light source 24 is directed toward the light-transmitting portion 22 and outputted from the housing 20 toward the ground surface 26 and toward the vehicle 12 to excite the photoluminescent structure 14. With respect to the embodiments provided herein, light from the light source 24 that is directed toward the ground surface 26 is represented by arrows 28 while light from the light source 24 that is directed toward the vehicle 12 for exciting the photoluminescent structure 14 is represented by arrows 30.

Figure 2:
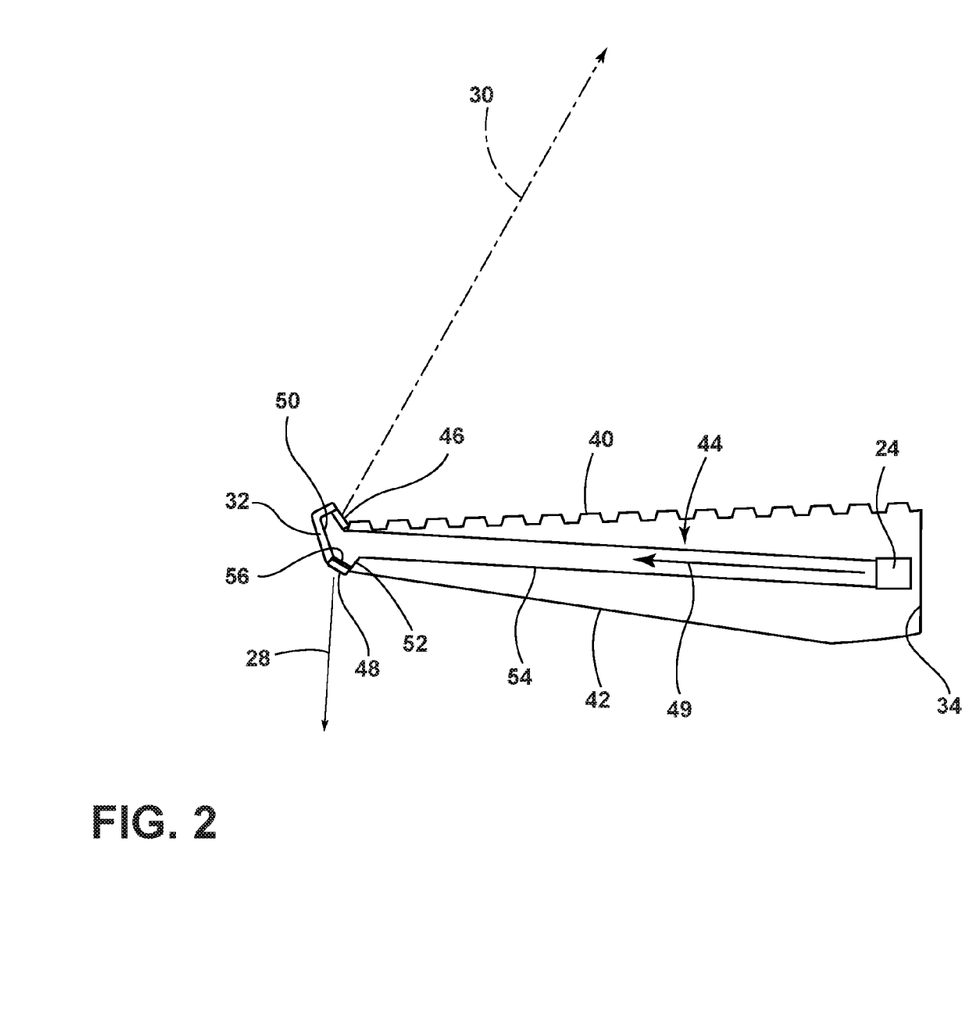
FIG. 2 is cross-sectional view of the running board taken along line II-II of FIG. 1.
Figure 3:
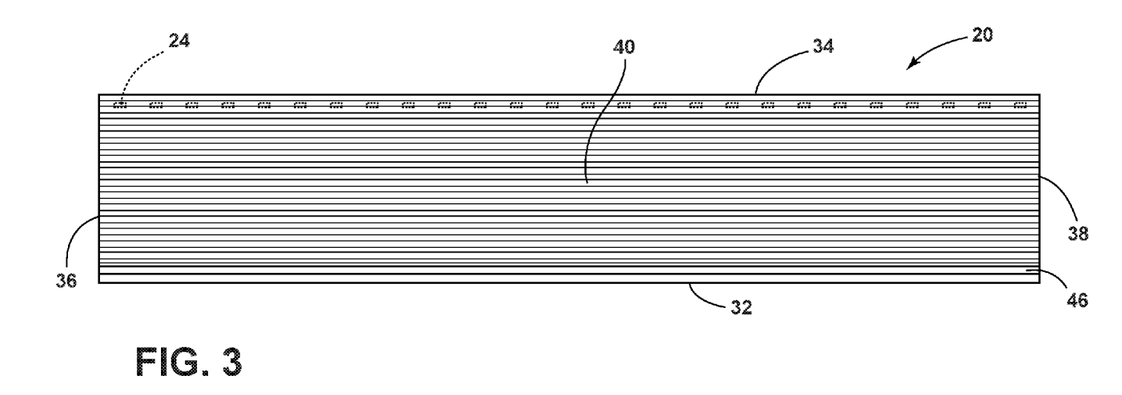
FIG. 3 is a top view of the running board.
Figure 4:
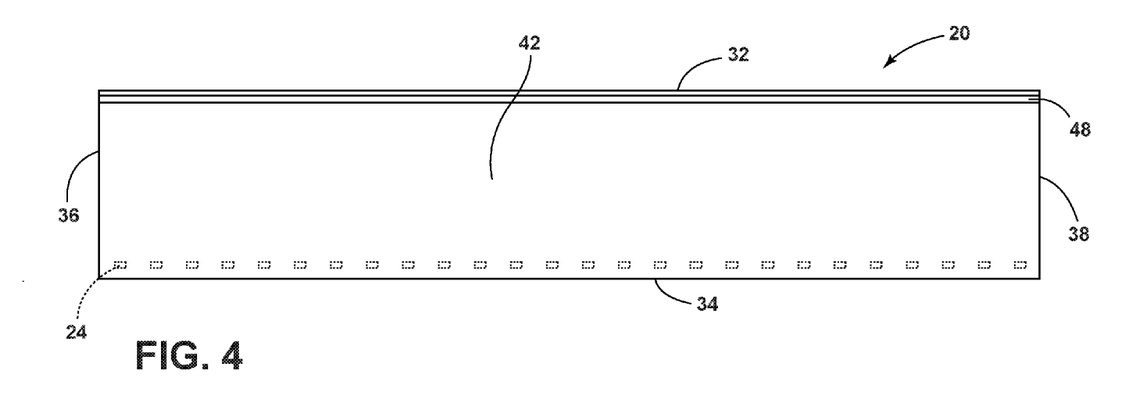
FIG. 4 is a bottom view of the running board.

Referring to FIGS. 2-4, the housing 20 includes a first edge 32, a second edge 34, a third edge 36, and a fourth edge 38. The first and second edges 32, 34 are disposed opposite one another and extend longitudinally along the length of the running board 16. The third and fourth edges 36, 38 are disposed opposite one another and extend transversely along the width of the running board 16. When the vehicle 12 is viewed from the side, the first edge 32 corresponds to the front of the running board 16 while the second edge 34 corresponds to the rear of the running board 16. The housing 20 also includes a top portion 40 and bottom portion 42. The top portion 40 generally corresponds to a step area of the running board 16 and may be treaded to provide traction during vehicle ingress and egress.

In the depicted embodiment, the light source 24 is disposed inside the housing 20 in greater proximity to the second edge 34 than the first edge 32 and is oriented to face the first edge 32. The light source 24 may be configured as a plurality of light emitting diodes (LEDs) extending longitudinally along the length of the running board 16. It is contemplated that the LEDs may be arranged as clusters, strip(s), etc. A light guide 44 is provided inside the housing 20 and is configured to direct light from the light source 24 toward the first edge 32 and output the light from the housing 20 in at least two separate and distinct directions. For example, the light guide 44 may be configured to direct light from the light source 24 toward the first edge 32 and output the light from the housing 20 via a first and second optic 46, 48. For purposes of illustration, light emitted from the light source 24 is exemplarily represented by arrow 49 in FIG. 2.

The first and second optics 46, 48 together define the light-transmitting portion 22 of FIG. 1 and are arranged as strips extending longitudinally along the length of the running board 16. The first and second optics 46, 48 are separate from each other and are each disposed adjacent the first edge 32. The first optic 46 at least partially defines the top portion 40 of the housing 20 and is coupled to an upward extending portion 50 of the light guide 44. The first optic 46 is configured to direct light in an upward direction toward the vehicle 12 to excite the photoluminescent structure 14. The second optic 48 at least partially defines the bottom portion 42 of the housing 20 and is coupled to a downward extending portion 52 of the light guide 44. The second optic 48 is configured to direct light in a downward direction toward the ground surface 26, thereby functioning as a puddle lamp. Both the upward and downward extending portions 50, 52 extend from a flat portion 54 of the light guide 44 and may be in abutting contact with the first edge 32. The first edge 32 may be raised slightly to conceal the first optic 46 when the vehicle 12 is viewed from the side. The first edge 32 is generally opaque but may be configured to transmit light.

A photoluminescent structure 56 (FIG. 2) is coupled to the second optic 48 and is configured to convert light emitted by the light source 24 into light of a different wavelength that is then outputted from the housing 20 toward the ground surface 26 via the second optic 48. In such an embodiment, photoluminescent structures 14 and 56 are each configured to luminesce in response to light excitation by the light source 24. With respect to the embodiments provided herein, the luminescence exhibited by photoluminescent structures 14 and 56 may be expressed in a variety of colors found in a conventional RGB color scale and the light excitation supplied by the light source 24 may include visible and/or invisible light.

In embodiments employing photoluminescent structures 14 and 56, the light source 24 may be configured to selectively emit light of a first wavelength and a second wavelength that is different than the first wavelength. For example, the light of the first wavelength may correspond to ultraviolet (UV) light and the light of the second wavelength may correspond to blue light. However, it will be appreciated that other light, visible or invisible, may be used instead. In such an embodiment, the photoluminescent structure 14 located on the side of the vehicle 12 may be configured to luminesce in response to light excitation provided by one of the light having the first wavelength and the light having the second wavelength. The photoluminescent structure 56 coupled to the second optic 48 may be configured to luminesce in response to light excitation provided by the other of the light having the first wavelength and the light having the second wavelength. In one specific embodiment, photoluminescent 14 is configured to luminesce in response to UV light whereas photoluminescent 56 is configured to luminesce in response to blue light. It is contemplated that the UV light may be provided by a UV LED strip and the blue light may be provided by a blue LED strip. Thus, both of photoluminescent structures 14 and 56 will luminesce if the light source 24 is operated to emit both UV light and blue light. Alternatively, only photoluminescent structure 14 will luminesce if the light source 24 is operated to emit UV light exclusively. Alternatively still, only photoluminescent structure 56 will luminesce if the light source 24 is operated to emit blue light exclusively. With respect to the embodiments described herein, the luminescence exhibited by photoluminescent structures 14 and 24 is typically visible and may be of similar or different colors.

In another embodiment, photoluminescent structure 14 is configured to luminesce in response to UV light and blue light while photoluminescent structure 56 is configured to luminesce in response to blue light. In such an embodiment, the light source 24 may be operated to emit only blue light so as to simultaneously excite photoluminescent structures 14 and 56. Alternatively, the light source 24 may be operated to emit only UV light so as to exclusively excite photoluminescent structure 14. Alternatively still, the light source 24 may be operated to emit both UV light and blue light so as to simultaneously excite photoluminescent structures 14 and 56. Since photoluminescent structure 14 is capable of luminescing in response to light excitation from UV and/or blue light, it will be appreciated that photoluminescent structure 14 may be configured to luminesce in different colors depending on whether the light excitation is provided by UV light only, blue light only, or both. For example, the photoluminescent structure 14 may luminesce in a first color in response to light excitation by UV light only and a second color in response to light excitation by blue light only. If the first and second colors are different, then the photoluminescent structure 14 will luminesce in a third color in response to simultaneous light excitation by both UV and blue light, the third color being expressed as a color mixture of the first and second colors. It will be understood that photoluminescent structure 56 may be configured to luminesce in response to more than one wavelength of light, if desired. It will also be understood that the specific examples of light excitation provided herein should not be seen as limiting and are provided to illustrate that a variety of lighting schemes may be implemented by selectively exciting photoluminescent structures 14 and/or 56.

Figure 5:
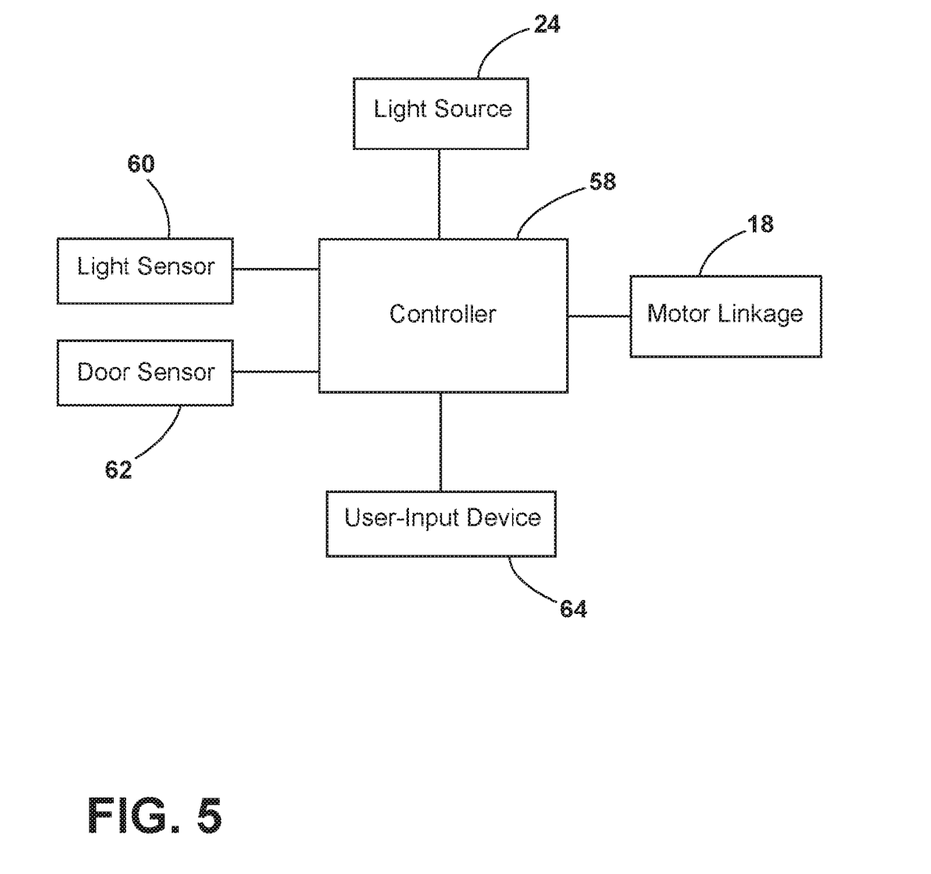
FIG. 5 is a block diagram of the lighting system.

Referring to FIG. 5, the lighting system 10 may further include a controller 58 configured to operate the motor linkage 18 in order to deploy and retract the running board 16. The controller 58 is also configured to operate the light source 24 according to any of the embodiments described herein. In operating the motor linkage 18 and the light source 24, the controller 58 may utilize signals provided from one or more vehicle equipment exemplarily shown as a light sensor 60 (e.g., day/night sensor) configured to detect light levels in the operating environment of the vehicle 12, a door sensor 62 configured to detect door opening/closing and/or locking/unlocking of the vehicle 12, and a user-input device 64 enabling a vehicle occupant to provide user-input to the controller 58.

In one exemplary scenario, the controller 58 deploys the running board 16 and operates the light source 24 to excite photoluminescent structure 14 and/or 56 if the light sensor 60 detects low light conditions. When the vehicle 12 is in park, for example, the controller 58 may deploy the running board 16 and operate the light source 24 to supply light for exciting photoluminescent structure 14 and/or 56. This feature may be implemented when the vehicle 12 is occupied or unoccupied. Alternatively, when the vehicle 12 is in drive, the controller 58 may deploy the running board 16 and operate the light source 24 to only supply light for exciting photoluminescent structure 14 to produce a lighting effect by way of the decorative strip and icon. In instances where UV light serves as the light excitation for photoluminescent structure 14, it is possible for the photoluminescent structure 14 to luminesce in response to sunlight during the day. Accordingly, the controller 58 may maintain the running 16 board in the stowed position during the day in favor of using sunlight to excite photoluminescent structure 14.

In another exemplary scenario, the controller 58 may deploy the running board 16 and operate the light source 24 to supply light for exciting photoluminescent structure 14 and/or 56 based on door opening/closing and/or locking/unlocking of the vehicle 12 as detected by the door sensor 62. In instances where the light excitation associated with photoluminescent structure 14 is visible, the first optic 46 may be configured to aim the light excitation below a belt line 66 (FIG. 1) so as not to dazzle an occupant that is entering or leaving the vehicle 12. Alternatively, the controller 58 may deactivate the light source 24 such that light excitation is not provided to photoluminescent structure 14 during moments of vehicle egress and ingress.

Figure 6:
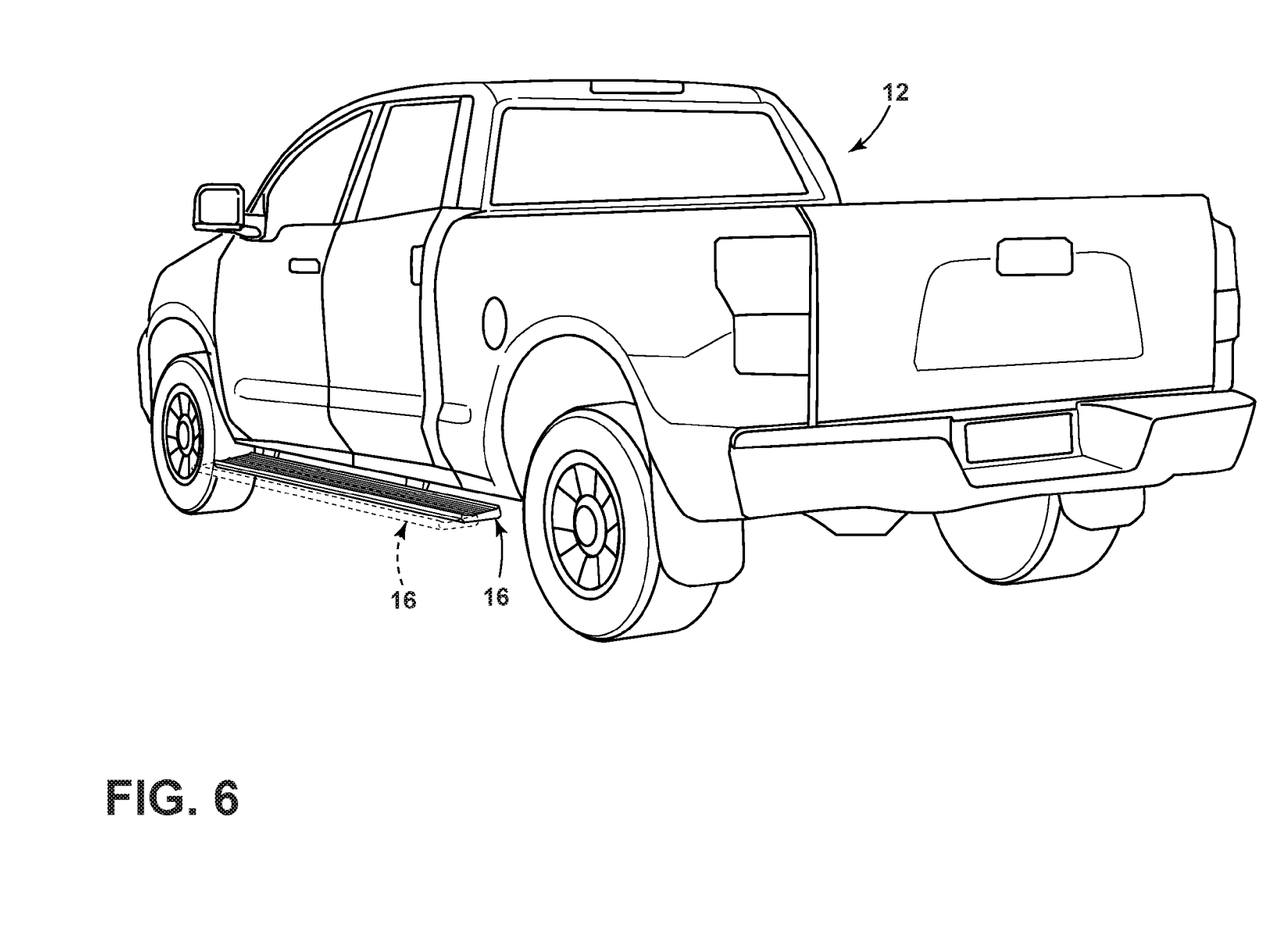
FIG. 6 illustrates the running board being deployed between two positions.

With respect to the embodiments provided herein, the controller 58 may operate the light source 24 to continuously or periodically provide light excitation to photoluminescent structure 14 and/or 56. It is contemplated that the controller 58 may receive input via the user-input device 64. Such input may adjust a setting of the light source 24 such as, but not limited to, an activation state, a brightness level, a light color, and the like. The user-input device 64 may correspond to a touchscreen display of the vehicle 12 or other user-input device located inside the vehicle 12. Additionally or alternatively, the user-input device 64 may correspond to a portable electronic device such as a smartphone, tablet, or the like. Also, it is contemplated that the running board 16 may be deployable between a plurality of deployed positions. For example, as shown in FIG. 6, the running board 16 may be deployed to a first position, which is shown in solid lines, to facilitate ingress and egress from the vehicle 12, and a second position, which is shown in phantom lines, to facilitate the delivery of light excitation toward the vehicle 12 to excite photoluminescent structure 14. In the second position, the running board 16 extends further outward from the vehicle 12 than in the first position. In some embodiments, the running board 16 is deployable to the second position only when the vehicle 12 is in drive. It should be appreciated that the light source 24 may be operated when the running board 16 is in either of the first and second positions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this detailed description.

What is claimed is:

1. A lighting system of a vehicle, comprising:
 a photoluminescent structure coupled to an exterior of the vehicle; and
 a running board coupled to the vehicle and comprising:
  a housing having opposing first and second edges;
  a light source located inside the housing and disposed in greater proximity to the second edge than the first edge; and
  a light guide configured to direct light from the light source toward the first edge;
  a first optic adjacent the first edge and configured to direct light toward the photoluminescent structure; and
  a second optic adjacent the first edge and configured to direct light toward a ground surface.

2. The lighting system of claim 1, wherein the first and second edges extend longitudinally along the housing.

3. The lighting system of claim 1, wherein the first optic at least partially defines a top portion of the housing, and the second optic at least partially defines a bottom portion of the housing, and wherein the first optic is coupled to an upwardly extending portion of the light guide and the second optic is coupled to a downwardly extending portion of the light guide.

4. The lighting system of claim 1, wherein the first and second optics are arranged as strips extending longitudinally along the running board.

5. The lighting system of claim 1, wherein the light source is configured to selectively emit light of a first wavelength and a second wavelength that is different than the first wavelength.

6. The lighting system of claim 5, wherein the photoluminescent structure is configured to luminesce in response to excitation by light of the first wavelength, and wherein the second optic is configured to convert light of the second wavelength into light of a different wavelength and direct converted light toward the ground surface.

7. The lighting system of claim 1, wherein the running board is deployable to a first position to facilitate ingress and egress from the vehicle and a second position to facilitate delivery of light toward the vehicle to excite the photoluminescent structure, the running board extending further outward from the vehicle in the second position than in the first position.

8. A running board of a vehicle, comprising:
 opposing first and second edges;
 a light source disposed proximate the second edge;

a light guide configured to direct light from the light source toward the first edge;

a first optic disposed adjacent the first edge and configured to direct light in an upward direction toward the vehicle; and a second optic coupled to the light guide and configured to direct light toward a ground surface.

9. The running board of claim 8, wherein the first and second edges extend longitudinally along the running board, and wherein the first and second optics are arranged as strips extending longitudinally along the running board.

10. The running board of claim 8, wherein the first optic at least partially defines a top portion of the running board, and the second optic at least partially defines a bottom portion of the running board, and wherein the first optic is coupled to an upwardly extending portion of the light guide and the second optic is coupled to a downwardly extending portion of the light guide.

11. The running board of claim 8, wherein the light source is configured to selectively emit light of a first wavelength and a second wavelength that is different than the first wavelength.

12. The running board of claim 11, wherein the first optic is configured to direct light of the first wavelength toward the vehicle to excite a photoluminescent structure that luminesces in response thereto, and wherein the second optic is configured to convert light of the second wavelength into light of a different wavelength and output converted light toward the ground surface.

13. The running board of claim 8, deployable to a first position to facilitate ingress and egress from the vehicle and a second position to facilitate delivery of light toward the vehicle, the running board extending further outward from the vehicle in the second position than in the first position.

14. A running board of a vehicle, comprising:
opposing first and second edges;
a light source disposed proximate the second edge;
a light guide configured to direct light from the light source toward the first edge;
a first optic coupled to the light guide and configured to direct light toward a photoluminescent structure located external to the running board; and
a second optic coupled to the light guide and configured to direct light toward a ground surface.

15. The running board of claim 14, wherein the first and second edges extend longitudinally along the running board, and wherein the first and second optics are arranged as strips extending longitudinally along the running board.

16. The running board of claim 14, wherein the first optic at least partially defines a top portion of the running board, and the second optic at least partially defines a bottom portion of the running board, and wherein the first optic is coupled to an upwardly extending portion of the light guide and the second optic is coupled to a downwardly extending portion of the light guide.

17. The running board of claim 14, wherein the light source is configured to selectively emit light of a first wavelength and a second wavelength that is different than the first wavelength.

18. The running board of claim 17, wherein the photoluminescent structure is configured to luminesce in response to excitation by light of the first wavelength, and wherein the second optic is configured to convert light of the second wavelength into light of a different wavelength and direct converted light toward the ground surface.

19. The running board of claim 14, deployable to a first position to facilitate ingress and egress from the vehicle and a second position to facilitate delivery of light toward the vehicle to excite the photoluminescent structure, the running board extending further outward from the vehicle in the second position than in the first position.

20. The running board of claim 14, wherein the first edge is configured to conceal the first optic from vehicle onlookers.

* * * * *